United States Patent [19]

Snyder, Jr.

[11] 4,130,818
[45] Dec. 19, 1978

[54] ANALOG THRESHOLD DECODING
[75] Inventor: John S. Snyder, Jr., Monrovia, Md.
[73] Assignee: Communications Satellite Corporation, Washington, D.C.
[21] Appl. No.: 789,589
[22] Filed: Apr. 21, 1977
[51] Int. Cl.$^2$ ............................................. G06F 11/12
[52] U.S. Cl. ................ 340/146.1 AQ; 340/146.1 AV
[58] Field of Search ............ 340/146.1 AQ, 146.1 AV
[56] References Cited
U.S. PATENT DOCUMENTS

| 3,662,338 | 5/1972 | Cain | 340/146.1 AV |
| 3,789,360 | 1/1974 | Clark, Jr. et al. | 340/146.1 AQ |
| 4,015,238 | 3/1977 | Davis | 340/146.1 AQ |

OTHER PUBLICATIONS

Rudolph, Generalized Threshold Decoding of Convolutional Codes, IEEE Trans. on Info. Theory, vol. IT-16, No. 6, Nov. 1970, pp. 739-745.

*Primary Examiner*—Charles E. Atkinson
*Attorney, Agent, or Firm*—Sughrue, Rothwell, Mion, Zinn and Macpeak

[57] ABSTRACT

A decoder for correcting and decoding convolutionally-coded digital data utilizes probability information. Convolutionally-coded information and parity sequences are first derived from a demodulator in analog form and then sent to analog shift registers which store the sequences. The shift registers are tapped according to the particular code, and analog multiplications of the tapped shift register outputs are then performed, with sign inversion where necessary, to produce either independent estimates of the output or independent parity checks on a single output estimate. In the former case, the estimates are then summed to a single analog output which represents a binary 1 if positive and a binary 0 if negative. In the latter case, the parity checks are summed to a single analog value which represents disagreement with the single output estimate if positive and agreement with it if negative.

25 Claims, 8 Drawing Figures

FIG 3
TYPE I, RATE 1/2,
G=1100101

FIG 4
TYPE II DECODER

FIG 4a
TYPE II DECODER

FIG 5 RATE 1/2 DECODER TYPE II

FIG 7  RATE 1/2, G=1101101

FIG 6  RATE 1/2, TYPE II DECODER

ANALOG THRESHOLD DECODING

BACKGROUND OF THE INVENTION

The present invention relates generally to the field of error correcting for digital information transmission and processing systems and, in particular, to threshold decoders for convolutional and block codes.

Heretofore, convolutionally-coded data transmissions have been decoded by a number of techniques which rely upon digital methods and algorithms for their implementation. The general methods used have been known as Viterbi decoding, conventional threshold decoding and a posteriori probability (APP) decoding. Within these methods, there have been refinements which have improved performance and which have also increased their complexity.

The greatest real-time convolutional coding gains are presently achieved by employing the Viterbi decoding algorithm with soft detection techniques. A Viterbi decoder becomes impractical, however, for code rates greater than about three-quarters (3 information bits out of 4 transmitted bits) and constraint lengths greater than about 10 information bits. Even where practical, the Viterbi decoder is a complex and expensive apparatus.

Conventional threshold decoders utilize hard decisions and are readily implemented with standard digital integrated circuits. The performance of a conventional threshold decoder does not match that of a Viterbi decoder, but the use of a conventional threshold decoder is quite practical for high code rates and very long constraint lengths because the complexity of such a decoder is not as sensitive a function of code rate and constraint length as is a Viterbi decoder. Hard-decision decoding ignores the noise probability distribution in the information channel. As a consequence, the use of hard-decision techniques reduces the possible gain of a decoding method by approximately 2dB.

The use of input data in analog form has been used to calculate non-linear weighting factors which are used to weight parity checks in a method known as a posteriori probability (APP) decoding. The APP method of using probability information in threshold decoding involves formation of hard-decision parity checks obtained by conventional hard-decision threshold decoding.

Approximate APP decoding techniques employing three-bit soft decisions have also been proposed. These digital approaches essentially perform conventional hard-decision threshold decoding. In addition, a reliability estimate assigned to each input bit is used to weight either the conventional parity checks or the threshold value. The approximate APP techniques, while less complicated than the exact APP method, are still considerably more complex than hard-decision threshold decoders. Further, the approximate APP decoders generally require analog-to-digital (A/D) conversion and triple the number of storage registers needed for conventional hard-decision decoding, as well as the necessary circuitry to process the reliability weightings.

Threshold decoders have been divided into two types by J. L. Massey in Threshold Decoding, published by MIT Press, Cambridge, Mass. (1963). The two types of decoding are Type I and Type II. Type I recalculates parity sequences and compares the calculated sequences to those which are received. The results of the compared parity checks are stored in shift registers and are combined to form a set of J orthogonal parity checks for each output pit. A majority decision of the J parity checks is used to determine agreement or disagreement as to the output estimate. In a Type II decoder, the decoder does not recalculate parity, but stores the received information and parity sequences directly in shift registers. Instead of forming J parity checks relative to a single element, J plus 1 estimates of each output bit are obtained and a majority determination is made. In both Type I and Type II cases, J plus 1 is generally equal to the minimum distance property of the code.

SUMMARY OF THE INVENTION

The present invention provides a decoding apparatus using analog techniques in the decoding processing. Soft decisions are used throughout the decoding process. The use of analog storage devices, analog multipliers, analog summation and a comparator provide for the soft decisions throughout the analog steps of generating the estimates of the output. The analog storage devices may be analog shift registers, delay lines or banks of capacitors or any other suitable storage device. The analog decoder produces either probability-weighted output estimates or probability-weighted parity checks directly without the need for intermediate hard-decision decoding or weighting factor calculation as required in APP decoding. The analog threshold decoder of this invention provides a decoder which is much less complicated and complex than the Viterbi and APP decoders used heretofore, and yet is more powerful than the conventional threshold decoder utilizing hard-decision techniques. This analog threshold decoder, unlike the APP decoder, requires no analog-to-digital conversion. The analog threshold decoder of this invention provides a decoder which utilizes analog techniques for decoding convolutionally-coded data.

The Type I analog threshold decoder provides independent parity checks upon a single output estimate, and these parity checks, when added together to obtain a single quantity, determine agreement or disagreement with the single output estimate. When the result of the summation is negative, the output estimate is retained. When the result of the summation is positive, the output estimate is complemented.

The Type II analog threshold decoder provides independent estimates of the output of varying magnitude, and these estimates, when added together to obtain a single quantity, determine the output. When the output is positive, a binary 1 is obtained, and when the output is negative, a binary 0 is obtained. The analog threshold decoder further provides a set of orthogonal output estimates which are derived by analog shift registers.

DETAILED DESCRIPTION OF THE INVENTION

Figure 1:
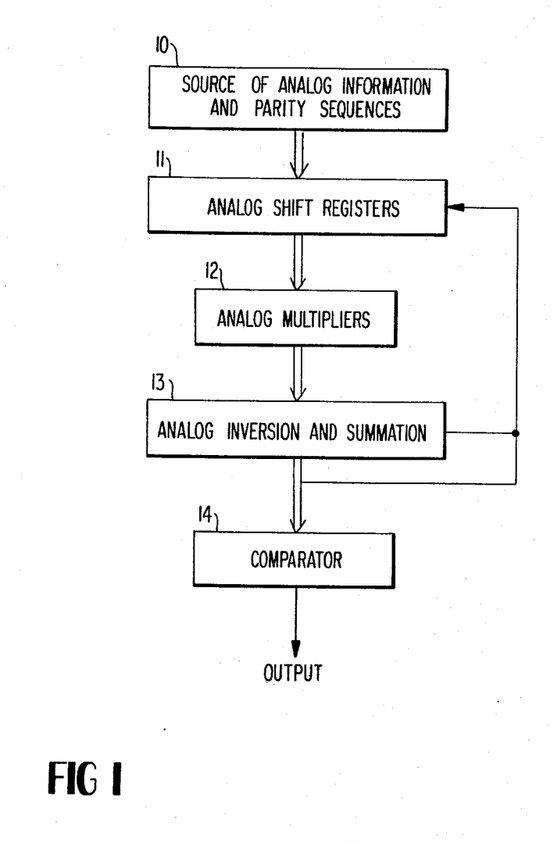
FIG. 1 shows the use of analog processing for detection of errors in a series of information sequences.

The analog decoding technique of this invention is applicable to both Type I and Type II decoders as designated by Massey. FIG. 1 shows a source of analog information and parity sequences 10 which are stored in analog shift registers 11. The analog shift registers 11 are tapped in accordance with a particular code being used. Analog multiplications are performed by multipliers 12 on the tap signals and the results are combined by the inversion and summation device 13 to form either a composite analog output estimate or a composite analog parity check. Comparator device 14 produces binary "1s" and binary "0s" when the input is positive or negative. The analog threshold decoder is therefore conceptually simpler than a true APP decoder and avoids the approximate APP decoder's need for analog-to-digital conversion, numerous digital registers and circuitry to process the reliability rating.

The implementation of the device of FIG. 1 is accomplished by use of semiconductor devices which are now available from the following sources.

| Device | Part Number & Source |
|---|---|
| Analog Shift Register | TAD-32 Reticon Corp. |
| Analog Multiplier | AD 532 Analog Devices Inc. |
| Inversion and Summation -Operational Amplifier | AD 518 Analog Devices Inc. |
| Comparator | LM 311 National Semiconductor Corp. |

Type I Decoder

Figure 2:
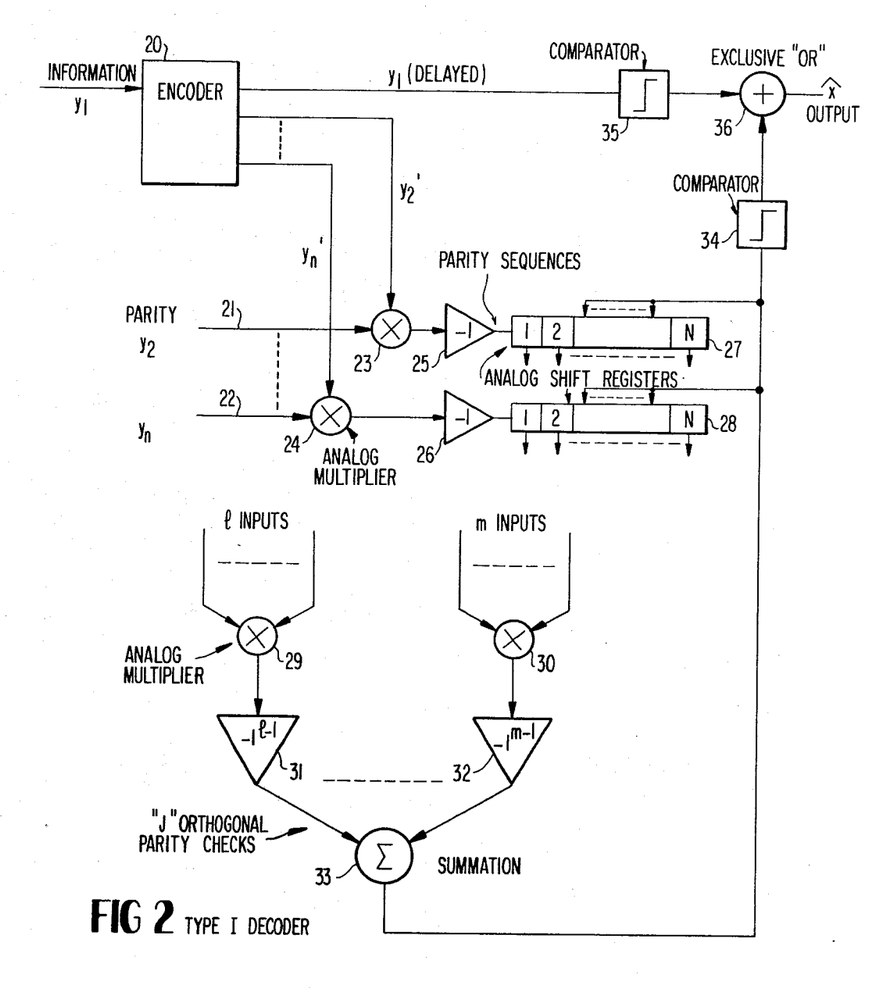
FIG. 2 shows a Type I decoder which incorporates analog threshold decoding.

The implementation of this invention in a Type I decoder is shown in FIG. 2. The parity sequences which are fed to the analog shift registers are formed by the use of an encoder 20 which recalculates the parity sequences $y_2'$ through $y_n'$. The received parity $y_2$ through $y_n$ on lines 21, 22 is then compared to the calculated parity by analog multipliers 23, 24. The output of the analog multipliers is then inverted by inverters 25, 26 and fed to the analog shift registers. The parity check sequences which enter the shift registers will all be negative if the received parity is in agreement with the recalculated parity. If there is disagreement, positive quantities will be stored in the analog shift registers. At this point, if errors exist, the taps on the analog shift registers 27, 28 will feed their information to analog multipliers 29, 30 in accordance with a tap selection, which is dictated by the code used in the same manner as for conventional hard-decision threshold decoding. The J orthogonal parity checks are generated by multipliers 29, 30, and the product of each multiplier is then inverted if the number of terms entering into it is even. The processing through the multipliers 29, 30 and inverters 31, 32 will produce the J orthogonal parity checks which are then summed. In actual practice, discrete inverters, such as 31, 32, are not used because the required sign may be obtained by utilizing the appropriate inverting or non-inverting inputs of available operational summers. If the output of the summation device is negative, this will indicate that there has in fact been no error in the corresponding information bit. If the output of the summation device 33 is positive, this will indicate an error. The comparator 34 will receive the positive or negative summation output and convert it to a 1 or a 0 dependent upon whether the sign is positive or negative. Similarly, comparator 35 operates on the delayed information signal from the encoder 20 to produce a delayed 1 or 0 information signal. The exclusive OR gate 36 will then produce an output which is the same as that received from comparator 35 whenever the output of comparator 34 is 0. If the output of 34 becomes a 1, then the exclusive OR gate will change the bit received from the information comparator 35 to correct the data error detected by the processing of the parity check sequences through shift registers 27, 28 through multipliers 29, 30 and by the summation at 33.

Detected errors are fed back to the analog shift registers 27, 28 from the output of the summation device 33 to eliminate their effect from future determinations. However, feedback is not used or required when definite decoding is used.

When self-orthogonal codes are employed, a major simplification of the Type I analog decoder of FIG. 2 is possible. The multipliers 29, 30 and inverters 31, 32 may be completely eliminated because the comparison between calculated and received parity sequences at multipliers 23, 24 will yield the orthogonal parity checks directly. Therefore, the proper shift register stages may be connected directly to the summing device 33.

The parity checks determined by multipliers 23, 24 and inversion at inverters 25, 26 imply an encoder 20 which forms the reconstructed parity sequences in a soft fashion. However, for low code rates, little probability information is lost by employing a hard-decision encoder in place of encoder 20 to recompute the parity. Since reconstructed parity bits from a hard-decision encoder are either "1" or "0", the parity check multipliers 23, 24 and inverters 25, 26 become mere programmable analog inverters. Therefore, the multipliers 23, 24 may be eliminated, with the input parity being inverted or not inverted depending upon the calculated parity from encoder 20. If the hard-decision encoder is used in combination with the use of self-orthogonal codes, all of the multipliers 23, 24, 29 and 30 of FIG. 2 may be eliminated.

Figure 3:
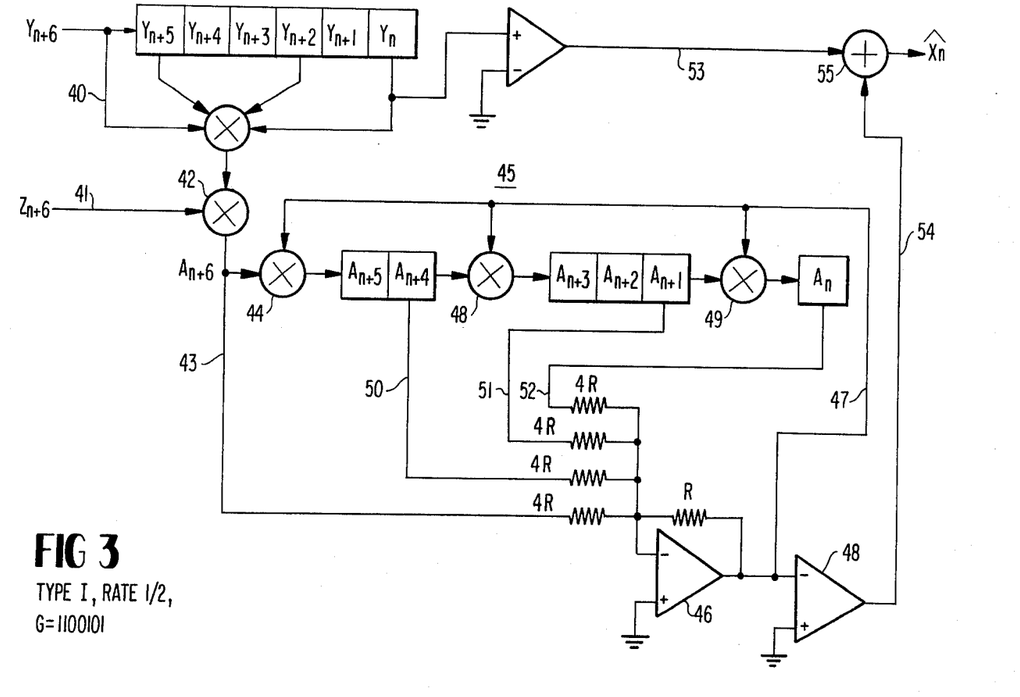
FIG. 3 shows a Rate ½ Type I decoder with the necessary taps to implement the code.

FIG. 3 shows the implementation of this invention in a Type I encoder with a Rate ½ code having a minimum distance of 5. The encoder 40 calculates the analog parity sequence from the received information sequence in accordance with the generating polynomial represented by $G \uparrow 1100101$. The received parity on line 41 is then compared to the calculated parity by the analog multiplier 42. The output of the analog multiplier, line 43, is applied to the next multiplier 44 which compares it to the feedback 47 from the summation device 46. An analog shift register 45 receives the output from 44. Additional multipliers 48, 49 are used to apply the feedback to the appropriate shift register stages. The outputs 50, 51 and 52 of the analog shift register and line 43 are applied to the negative terminal of summation device 46. The self-orthogonal code allows the simplification of eliminating the multiplication steps 29, 30 of the general case shown in FIG. 2. This is possible because the comparison of calculated and received parity sequences at multiplier 42 yields the desired orthogonal parity checks directly.

Figure 4:
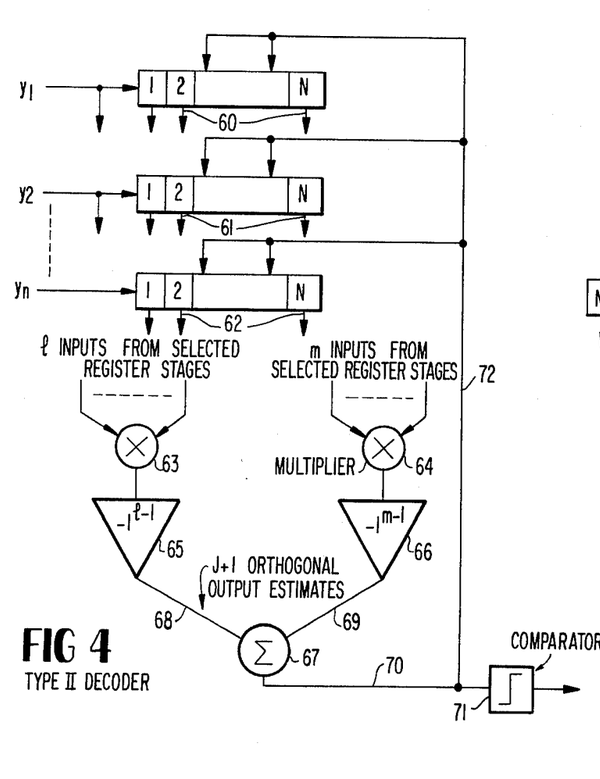
FIG. 4 shows a Type II decoder which incorporates analog threshold decoding.

The output (47) of summation device 46 is then applied to a comparator 48 which produces a binary "0" if its input is positive and a binary "1" if negative. The output of the comparator (54) along with the delayed information sequence from the encoder on line 53 are applied to exclusive "OR" gate 55 which produces the corrected output estimate $\hat{X}_n$. Type II Decoder The implementation of this invention in a Type II decoder is shown in FIG. 4. The information sequence is received on line $y_1$ and entered directly into shift register 60. The parity information $y_2-y_n$ is likewise entered into shift registers 61, 62.

The shift registers 60, 61 and 62 are tapped in accordance with the code being used in the same manner as in conventional threshold decoding. In general, any register stage may be tapped, as indicated in FIG. 4. The stages actually selected for a particular decoder are dependent upon the specific code used and are chosen such as to permit the formation of a set of orthogonal output estimates.

Analog multiplications of tapped signals are performed by multipliers 63, 64, and the product of each multiplier is then inverted if the number of terms entering into it is even. Each of the J plus 1 sign corrected products appearing on lines 68-69 represents an independent estimate of the output, and all of the estimates are added to obtain a single decoded analog output 70. The addition takes place in the adder or summation device 67. The output of comparator 71 is a 1 if the summation is positive and a 0 if the summation is negative.

In actual practice, discrete inverters, such as 65, 66, are not used because the required sign may be obtained by utilizing the appropriate inverting or non-inverting inputs of available operational summers.

FIG. 4 has been generalized to apply to either systematic or non-systematic codes. For systematic codes, one register contains information sequences and its final stage connects directly to the summation device, thereby eliminating a multiplier. As illustrated in FIG. 4, the threshold decoder operates on a rate 1/n convolutional code, since n input sequences and one output sequence are shown. The extension to rate k/n codes requires the addition of k adders each with its own set of J plus 1 multipliers.

The analog threshold decoder is ideally suited to charge-coupled device (CCD) implementation. However, such decoders require feedback of output information to alter the shift register contents. Such feedback is indicated on line 72 of FIG. 4 and, for the Type II decoder, is employed to alter the parity sequences by removing the effect upon them of previously-decoded output bits.

Figure 4A:
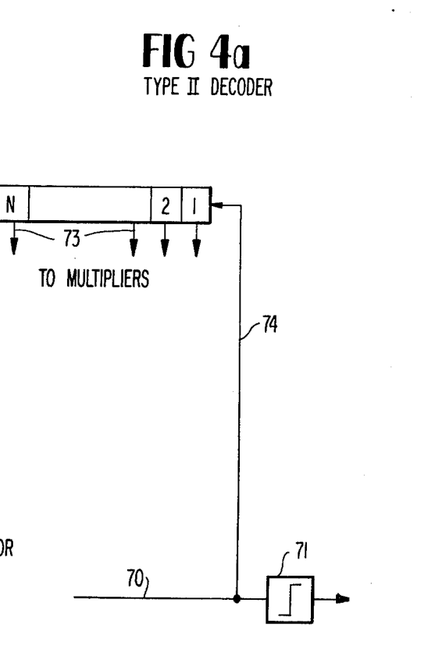
FIG. 4a shows the Type II decoder of FIG. 4 wherein an independent shift register is used to store previously-decoded output bits, instead of using them for feedback.

With present CCD technology, feedback taps on charge-coupled device shift registers are not practical. Therefore, for implementation with current CCD technology, it is proposed to incorporate a separate analog shift register 73 as shown in FIG. 4a into the system. FIG. 4a is a modification to FIG. 4 where line 72 is eliminated and replaced with line 74 which feeds the separate analog shift register 73. The outputs of the analog shift register 73 are then fed to the multipliers 63, 64 and used in the formation of the J plus 1 output estimates. The use of the single extra shift register shown in FIG. 4a represents, for systematic codes only, an extension of information sequence storage to twice as many bits. In the instance for rate k/n codes, k extra registers will be needed. Further, in the non-systematic case, the k extra registers holding past output data do not represent an extension of the top k analog registers as the latter contain parity sequences.

Figure 5:
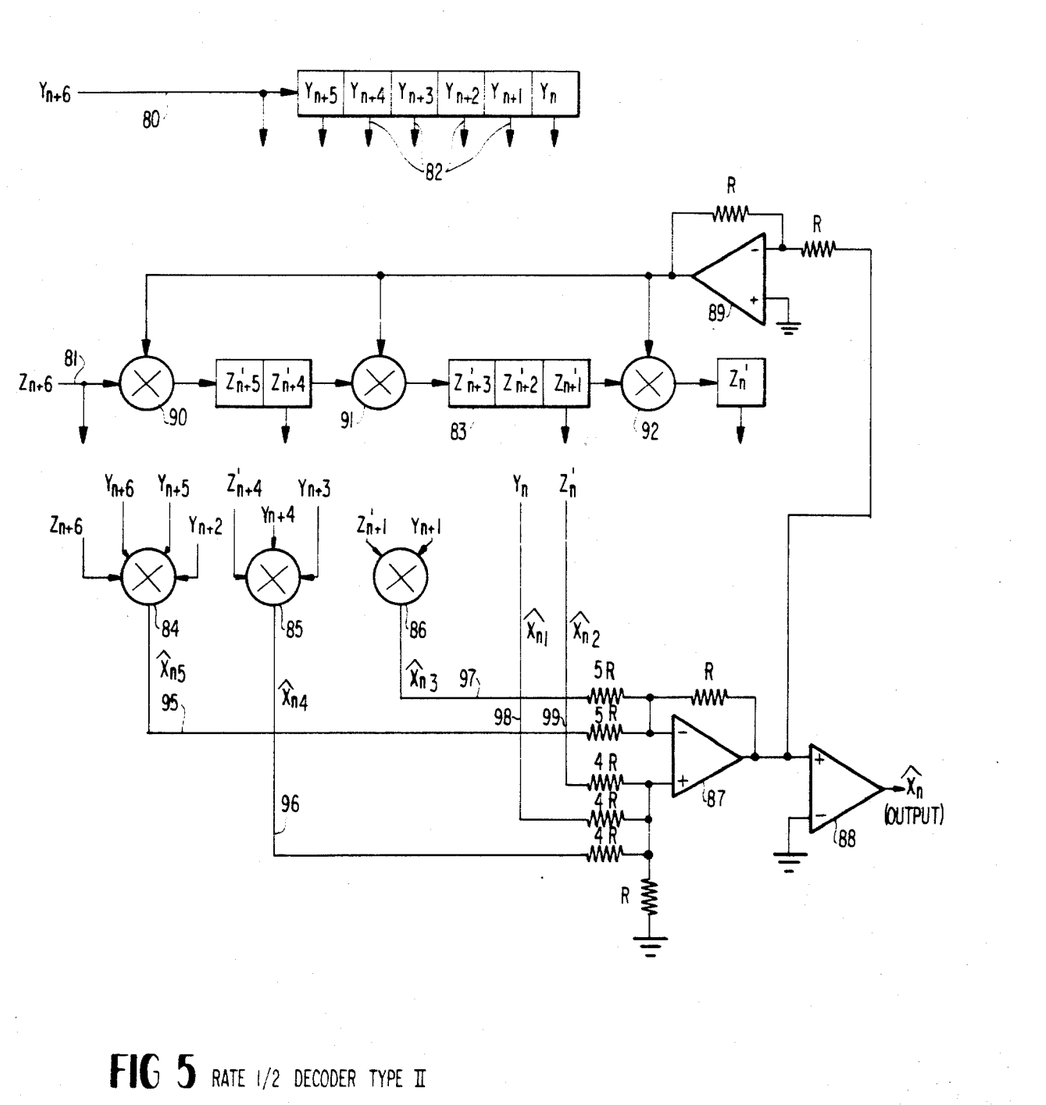
FIG. 5 shows a Rate ½ Type II decoder with necessary taps to implement the code.

FIG. 5 shows the implementation of the analog threshold decoder in a Type II decoder used with the same rate ½ systematic convolutional code (G = 1100101) employed previously in FIG. 3. The information and parity sequences from a demodulator appear in parallel on lines 80 and 81, respectively. These sequences are then fed to analog shift registers 82, 83. Shift registers 82, 83 are tapped in accordance with the rate ½ code G = 1100101 and are connected to the analog multipliers 84, 85 and 86 as shown. Further, the outputs of the multipliers are connected to the positive and negative terminal of the summer 87 so as to perform inversion if the number of terms entering into the multiplier stage is even. Thus, multipliers 84, 86 are fed to the negative terminal of summer 87 in order to perform the necessary inversion. The output of summer 87 is then fed to comparator 88 which produces a 1 if the output of 87 is positive and a 0 if the output of 87 is negative. Further, feedback from the output of 87, which is the analog output estimate, is fed back to the analog shift register stage 83 for the purpose of altering the parity sequences by removing the effect upon them of previously-decoded output bits.

The feedback of the previously-decoded bits is through an inverter 89 and to multipliers 90, 91 and 92 which are placed between shift register stages in accordance with the code which, in this case, is the rate ½ code G = 1100101.

Figures 6, 7:
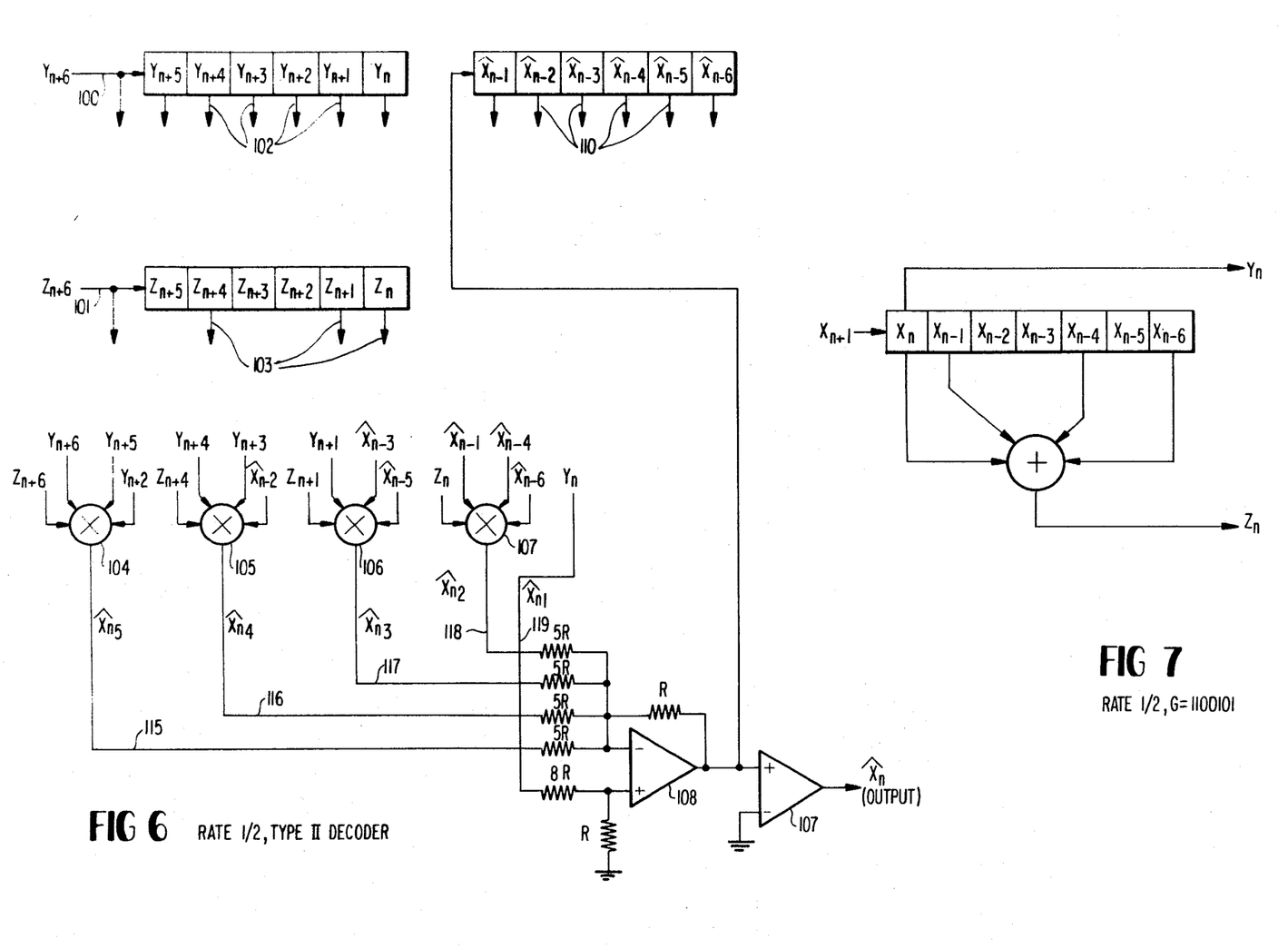
FIG. 6 shows a Rate ½ Type II decoder using an independent shift register, instead of feedback, with necessary taps to implement the code.
FIG. 7 shows an encoder for the Rate ½ code of FIGS. 3, 5 and 6.

The multiplier input connections and consequent analog shift register taps are obtained from the encoder equations which check a given bit, such as $X_n$. The G = 1100101 encoder is shown in FIG. 7, this encoder being located at the source of the data. As can be seen from FIG. 7, the following equations may be written:

$$Y_n = X_n$$

$$Z_n = X_n \oplus X_{n-1} \oplus X_{n-4} \oplus X_{n-6}$$

$$Z_{n+1} = X_{n+1} \oplus X_n \oplus X_{n-3} \oplus X_{n-5}$$

$$Z_{n+4} = X_{n+4} \oplus X_{n+3} \oplus X_n \oplus X_{n-2}$$

$$Z_{n+6} = X_{n+6} \oplus X_{n+5} \oplus X_{n+2} \oplus X_n.$$

In terms of the variables at the decoder, these equations may be solved to obtain the following five (5) estimates of $X_n$, which are those that would be solved for by a hard-decision threshold decoder:

$$\hat{X}_{n1} = Y_n$$

$$\hat{X}_{n2} = Z_n \oplus Y_{n-1} \oplus Y_{n-4} \oplus Y_{n-6}$$

$$\hat{X}_{n3} = Z_{n+1} \oplus Y_{n+1} \oplus Y_{n-3} \oplus Y_{n-5}$$

$$\hat{X}_{n4} = Z_{n+4} \oplus Y_{n+4} \oplus Y_{n+3} \oplus Y_{n-2}$$

$$\hat{X}_{n5} = Z_{n+6} \oplus Y_{n+6} \oplus Y_{n+5} \oplus Y_{n+2}$$

The exclusive −OR functions are replaced by multiply-and-invert operations implemented by multipliers 84, 85 and 86 and summation device 87. Feedback is applied by the multiply-and-invert operations of the multipliers 90, 91 and 92 and inverter 89, implementing the multiplications involving previously-decoded bits ($Y_{n-6}$ through $Y_{n-1}$). Thus, shift register 83 is tapped to provide inputs to multipliers 84, 85 and 86, as well as to summation device 87, such as to solve the following set of equations:

| | |
|---|---|
| $\hat{X}_{n1} = Y_n$ | Line 98 |
| $\hat{X}_{n2} = Z'_n$ | Line 99 |
| $\hat{X}_{n3} = -Z'_{n+1} \cdot Y_{n+1}$ | Line 97 |
| $\hat{X}_{n4} = Z'_{n+4} \cdot Y_{n+4} \cdot Y_{n+3}$ | Line 96 |
| $\hat{X}_{n5} = -Z_{n+6} \cdot Y_{n+6} \cdot Y_{n+5} \cdot Y_{n+2}$ | Line 95 | where the prime notation indicates a quantity that has been modified by feedback and the "hat" notation indicates an estimate.

A weighted summation of the five (5) estimates is provided at the output of summation device 87. Comparator 88 produces a binary "1" for the decoded output $\hat{X}_n$ if the weighted summation at its input is positive and a "0" if it is negative.

FIG. 6 shows another embodiment of a Type II analog threshold decoder for G = 1100101 which utilizes an independent shift register 110 for storing the previously-decoded bits. This, as explained above, is necessary because of the current limitations on CCD analog shift registers which do not permit the ready access to shift register stages which would allow the use of the multipliers 90, 91 and 92 as depicted in FIG. 5. With this limitation in mind, it is seen that the simplification using multipliers 90, 91 and 92 explained with respect to FIG. 5 is not possible and that all terms of the equations for $\hat{X}_{n1}$ through $\hat{X}_{n5}$ must be determined directly by the estimate-forming multipliers. This is accomplished in FIG. 6 by multipliers 104, 105, 106 and 107. Again, the outputs of multipliers 104-107 are inverted where necessary, summed in summer 108 and read as 1's and 0's by comparator 109. The shift registers 102, 103 are fed by the information bits on line 100 and the parity bits on line 101 as in FIG. 4a.

FIG. 5 as compared to FIG. 6 shows that the need for feedback to the analog shift register is eliminated at the expense of one extra shift register and extra inputs to the multipliers which form the estimates of the outputs.

While certain specific embodiments of the invention have been illustrated and described, it will be clear that variations of the details of construction which are specifically disclosed may be resorted to without departing from the spirit and scope of the invention, as defined in the appended claims.

What is claimed is:

1. An analog threshold decoder for decoding convolutionally-coded information and parity sequences with digital information which contains transmission errors comprising:
   an array of analog storage devices for receiving the information and parity sequences, each of said analog storage devices having a plurality of stages, selected stages having stage taps for producing outputs;
   an analog summation means connected to said analog storage device stage taps for summing analog storage device outputs; and
   a comparator means connected to the output of said summation means, said comparator means producing an output which is a binary "1" if the output of said summation means is positive, and a binary "0" if the output of said summation means is negative.

2. A threshold decoder as claimed in claim 1 further comprising analog multipliers for producing orthogonal parity checks having inputs connected to analog storage device stage taps and outputs connected to said summation means.

3. An analog threshold decoder as claimed in claim 1 wherein said summation means includes means for inverting the inputs from the analog storage device.

4. An analog threshold decoder according to claim 2 wherein said summation means includes an inversion means for inverting the inputs from said analog multipliers.

5. An analog threshold decoder for decoding convolutionally-coded information and parity sequences with digital information which contains transmission errors comprising:
   an array of analog storage devices for receiving the information and parity sequences, each of said analog storage devices having a plurality of stages, selected stages having stage taps for producing outputs;
   an analog summation means connected to said analog storage device stage taps for summing said analog storage device outputs;
   a feedback means connected to the output of said summation means and to selected stages of said analog storage devices; and
   a comparator means connected to the output of said summation means, said comparator means producing a corrected output estimate which is a binary "1" if the output of said summation means is positive, and a binary "0" if the output of said summation means is negative.

6. The threshold decoder as claimed in claim 5 wherein said storage device is an analog shift register.

7. A threshold decoder as claimed in claim 6 further comprising analog multipliers for producing orthogonal parity checks having inputs connected to the analog shift register stage taps and outputs connected to said summation means.

8. An analog threshold decoder as claimed in claim 5 wherein said summation means includes means for inverting the inputs from the analog storage devices.

9. An analog threshold decoder according to claim 7 wherein said summation means includes an inversion means for inverting the inputs from said analog multiplers.

10. An analog threshold decoder for convolutionally-coded information and parity sequences with digital information which contains transmission errors comprising:
    an encoder for recalculating parity sequences and for delaying said information;
    a first analog multiplier means connected to said encoder and to a source of received parity sequences for comparing said recalculated parity to received parity sequences;
    an array of analog storage devices connected to the output of said first multiplier for receiving the output of said first analog multiplier means, each of said analog storage devices having a plurality of stages, selected stages having stage taps for producing outputs;
    an analog summation means connected to said analog storage device stage taps for summing said analog storage device outputs;

a first comparator means connected to the output of said summation means for generating a binary "1" if the output of said summation means is positive, and a binary "0" if the output of said summation means is negative;

a second comparator means connected to said encoder for generating a binary "1" if the delayed information is positive, and a binary "0" if the delayed information is negative; and an exclusive "OR" gate connected to said first and second comparators for producing a corrected output estimate.

11. An analog threshold decoder according to claim 10 wherein said storage device includes an analog shift register.

12. An analog threshold decoder according to claim 11 which includes a feedback means connected to the output of said summation means and to selected stages of said analog shift registers.

13. An analog threshold decoder according to claim 10 wherein said encoder means is a digital convolutional encoder.

14. An analog threshold decoder according to claim 10 wherein said encoder means consists of an analog storage device, analog multipliers and an inverters.

15. The threshold decoder of claim 12 where in said analog storage device further includes a second analog multiplier means connected to selected stage taps of said analog shift registers in accordance with the code being transmitted for producing orthogonal parity checks, the output of said second multiplier means being connected to said summation means.

16. An analog threshold decoder as claimed in claim 12 wherein said summation means includes means for inverting the inputs from the analog shift registers.

17. An analog shift register according to claim 15 wherein said summation means includes an inversion means for inverting the inputs from said analog multipliers.

18. An analog threshold decoder for decoding convolutionally-coded information and parity sequences with digital information which contains transmission errors comprising:

an array of first analog shift registers for receiving the information and parity sequences, each of said analog shift registers having a plurality of stages, selected stages having stage taps for producing outputs;

a second analog shift register having a plurality of stages and selected stages having stage taps for producing outputs;

an analog summation means connected to said first and second analog shift register stage taps for summing said first and second analog shift register outputs;

a circuit means connected to the output of said summation means and to said second analog shift register input for storing previously-decoded output bits; and a comparator means connected to the output of said summation means, said comparator means producing a corrected output estimate which generates a binary "1" if the output of said summation means is positive, and a binary "0" if the output of said summation means is negative.

19. A threshold decoder as claimed in claim 18 further comprising analog multipliers for producing orthogonal output estimates having inputs connected to analog shift register stage taps and outputs connected to said summation means.

20. An analog threshold decoder as claimed in claim 18 wherein said summation means includes means for inverting the inputs from the analog shift registers.

21. An analog threshold decoder according to claim 19 wherein said summation means includes an inversion means for inverting the inputs from said analog multipliers.

22. An analog threshold decoder for convolutionally-coded information and parity sequences with digital information which contains transmission errors comprising:

an encoder for recalculating parity sequences and for delaying said information;

a first analog multiplier means connected to said encoder and to a source of received parity sequences for comparing said recalculated parity to received parity sequences;

an array of first analog shift registers connected to the output of said first multiplier for receiving said compared parity sequences, each of said analog shift registers having a plurality of stages, selected stages having stage taps for producing outputs;

a second analog shift register having a plurality of stages and selected stages having stage taps for producing outputs;

an analog summation means connected to said analog shift register stage taps for summing said first and second analog shift register outputs;

a connection means from the output of said summation means and to the input of said second analog shift register for storing previous parity checks;

a first comparator means connected to the output of said summation means for generating a binary "1" if the output of said summation means is positive, and a binary "0" if the output of said summation means is negative;

a second comparator means connected to said encoder for generating a binary "1" if the delayed information is positive, and a binary "0" if the delayed information is negative; and an exclusive "OR" gate connected to said first and second comparators for producing a corrected output estimate.

23. The threshold decoder of claim 22 further comprising second analog multiplier means connected to selected stage taps of said first and second analog shift registers in accordance with the code being transmitted for producing orthogonal parity checks, the output of said second multiplier means being connected to said summation means.

24. An analog threshold decoder as claimed in claim 22 wherein said summation means includes means for inverting the inputs from the analog shift registers.

25. An analog threshold decoder according to claim 23 wherein said summation means includes an inversion means for inverting the inputs from said analog multipliers.

* * * * *

UNITED STATES PATENT AND TRADEMARK OFFICE
CERTIFICATE OF CORRECTION

PATENT NO. : 4,130,818
DATED : December 19, 1978
INVENTOR(S) : John S. SNYDER, Jr.

It is certified that error appears in the above–identified patent and that said Letters Patent are hereby corrected as shown below:

IN THE SPECIFICATION:

Column 4, line 53 - delete "G↑1100101" insert -- G = 1100101 -- line 58 - between "from" and "44" insert -- multiplier --

Column 5, line 7 - delete "$X_n$" insert -- $\hat{X}_n$ -- line 7 - delete "Type II Decoder"

between
7 and 8 - insert as a heading -- Type II Decoder --

IN THE CLAIMS:

Column 9, line 26 - delete "an"

Signed and Sealed this

Twelfth Day of June 1979

[SEAL]

Attest:

RUTH C. MASON
*Attesting Officer*

DONALD W. BANNER
*Commissioner of Patents and Trademarks*